United States Patent
Dresser et al.

(10) Patent No.: US 10,891,872 B1
(45) Date of Patent: Jan. 12, 2021

(54) METHOD AND APPARATUS OF MUSIC EDUCATION

(71) Applicant: School of Rock, LLC, Canton, MA (US)

(72) Inventors: Sam Dresser, Wheaton, IL (US); Leonard A. Sitnick, Cantonsville, MD (US); Robert Lowell Price, Sharon, MA (US)

(73) Assignee: School of Rock, LLC, Canton, MA (US)

( * ) Notice: Subject to any disclaimer, the term of this patent is extended or adjusted under 35 U.S.C. 154(b) by 0 days.

(21) Appl. No.: 16/443,961

(22) Filed: Jun. 18, 2019

(51) Int. Cl.
G09B 15/00 (2006.01)
G06F 16/635 (2019.01)

(52) U.S. Cl.
CPC ........... *G09B 15/00* (2013.01); *G06F 16/635* (2019.01)

(58) Field of Classification Search
CPC .............................. G09B 15/00; G06F 16/635
See application file for complete search history.

(56) References Cited

U.S. PATENT DOCUMENTS

| | | | | |
|---|---|---|---|---|
| 5,585,583 A * | 12/1996 | Owen | ..................... | G09B 15/00 84/454 |
| 6,639,138 B1 * | 10/2003 | Hester | ..................... | G06Q 10/02 705/5 |
| 6,678,680 B1 * | 1/2004 | Woo | ....................... | G06F 16/683 |
| 7,838,755 B2 * | 11/2010 | Taub | ...................... | G10H 1/0058 84/609 |
| 7,890,374 B1 | 2/2011 | Khan | | |
| 2002/0002899 A1 * | 1/2002 | Gjerdingen | .............. | G10H 1/00 84/667 |
| 2002/0052933 A1 * | 5/2002 | Leonhard | ............... | G06Q 30/06 709/219 |
| 2004/0074376 A1 * | 4/2004 | Varme | ...................... | G10H 1/34 84/483.2 |
| 2006/0134590 A1 * | 6/2006 | Huffman | ................ | G09B 15/00 434/307 A |
| 2007/0131094 A1 * | 6/2007 | Kemp | ................... | G06F 16/632 84/609 |
| 2008/0190271 A1 * | 8/2008 | Taub | .................... | G10H 1/0058 84/645 |
| 2008/0190272 A1 * | 8/2008 | Taub | .................... | G10H 1/0058 84/645 |

(Continued)

OTHER PUBLICATIONS

International Search Report and Written Opinion in International Application No. PCT/US2020/038556 dated Sep. 16, 2020 (9 pages).

Primary Examiner — David S Warren
Assistant Examiner — Christina M Schreiber
(74) *Attorney, Agent, or Firm* — Nixon Peabody LLP

(57) ABSTRACT

A computer-aided method of educating music students includes assembling an ensemble of at least three music students studying differing instruments at differing proficiency levels and focusing on differing musical techniques. The method further includes compiling a multidimensional database of songs, wherein dimensions of the database include three or more of instrumentation requirements, technique requirements, musical styles represented, proficiency levels, and show theme suitability; and searching the database for songs having instrumentations, techniques, styles, and proficiency levels matching those of the students, and also having suitability with a desired show theme.

14 Claims, 7 Drawing Sheets

(56) References Cited

U.S. PATENT DOCUMENTS

| | | | | |
|---|---|---|---|---|
| 2008/0302233 A1* | 12/2008 | Ding | ............... | G09B 15/023 |
| | | | | 84/609 |
| 2009/0132077 A1* | 5/2009 | Fujihara | ............ | G06F 16/634 |
| | | | | 700/94 |
| 2015/0186419 A1* | 7/2015 | Agrawal | ............ | G06Q 30/02 |
| | | | | 707/722 |
| 2017/0018202 A1* | 1/2017 | Marradi | ............ | G10H 1/0016 |
| 2018/0341702 A1* | 11/2018 | Sawruk | ............ | G06N 3/0454 |
| 2019/0012381 A1 | 1/2019 | Debique | | |

* cited by examiner django_session
- session_key:VARCHAR
- session_data:LONGTEXT
- expire_date:DATETIME django_migrations
- id_INT
- app:VARCHAR
- name:VARCHAR
- applied:DATETIME auth_group_permissions
- id_INT
- group_id:INT
- permission_id:INT portal_user_groups
- id_INT
- user_id:INT
- group_id:INT portal_user_user_permissions
- id_INT
- user_id:INT
- permission_id:INT django_admin_log
- id_INT
- action_time:DATETIME
- object_id:LONGTEXT
- object_repr:VARCHAR
- action_flag:SMALLINT
- change_message:LONGTEXT
- content_type_id:INT
- user_id:INT

— 501

| FIG. 5A |
| FIG. 5B |
| FIG. 5C | auth_group
- id_INT
- name:VARCHAR auth_permission
- id_INT
- name:VARCHAR
- content_type_id:INT
- codename:VARCHAR portal_user
- id_INT
- password:VARCHAR
- last_login:DATETIME
- is_superuser:TINYINT
- username:VARCHAR
- first_name:VARCHAR
- last_name:VARCHAR
- email:VARCHAR
- is_staff:TINYINT
- is_active:TINYINT
- date_joined:DATETIME django_content_type
- id_INT
- app_label_VARCHAR
- model:VARCHAR

*FIG. 5A*

METHOD AND APPARATUS OF MUSIC EDUCATION

BACKGROUND

Current music education, whether performance-based or lesson-based, rely on method books and song catalogs that instructors use to lead each individual student stepwise from one level of skills and proficiency to another. Students are often grouped with others at similar levels, playing the same instrument, in an effort to make the process more efficient. Ensembles may then be assembled of students who have individually achieved the ability to play a particular song, and those ensembles then taught to perform together. This particular group learning technique can be demotivating for less proficient students and frustrating for more advanced students. Due to the long stretches of work on individual, isolated capabilities, students frequently lose interest in the learning process, or begin to lose old skills while focusing exclusively on new ones.

SUMMARY

The present invention addresses the identified problems with current music education, as well as additional problems not mentioned here. Using the invention, groups of students that are each working at different levels can work together as an ensemble. Using the invention, such a group learns new skills and improves existing skills through performance preparation and performance. By so doing, interest in the lessons, practice, and skills are enhanced, and ultimately skill retention is enhanced.

A computer-aided method of educating music students includes assembling an ensemble of at least three music students studying differing instruments at differing proficiency levels and focusing on differing musical techniques. The method further includes compiling a multidimensional database of songs, wherein dimensions of the database include three or more of instrumentation requirements, technique requirements, musical styles represented, proficiency levels, and show theme suitability; and searching the database for songs having instrumentations, techniques, styles, and proficiency levels matching those of the students, and also having suitability with a desired show theme. In a variation of the computer-aided method, searching further comprises: selecting songs by skills and techniques to be taught in individual lessons to individual students, wherein the selected songs can then be played by the ensemble of students using their differing instruments, differing proficiency levels, and differing musical techniques. In a further variation, searching further comprises: selecting songs that fit a common show theme. In an alternate further variation, searching further comprises: selecting additional songs by a combination of student preferences, skills, and techniques to be taught, that can then be played by the ensemble of students using their differing instruments, differing proficiency levels, and differing musical techniques. In another alternate further variation, searching further comprises: selecting additional songs by a combination of instructor preferences for demonstration purposes, and student skills and techniques to be taught, that can then be played by the ensemble of students using their differing instruments, differing proficiency levels, and differing musical techniques.

An improved music education system comprises: a server holding a multidimensional database of songs, wherein dimensions of the database include three or more of: instrumentation requirements, technique requirements, musical styles represented, proficiency levels, and show theme suitability; and a client for searching the database for songs having desired characteristics matching differing instruments, differing proficiency levels, and differing musical techniques of a group of students. In a variation, the music education system further comprises: selecting songs by skills and techniques to be taught in individual lessons to individual students, wherein the selected songs can then be played by the group of students using differing instruments, differing proficiency levels, and differing musical techniques. In a further variation, searching further comprises: selecting songs that fit a common show theme. In an alternate further variation, searching further comprises: selecting additional songs by a combination of student preferences, skills, and techniques to be taught, that can then be played by the group of students using differing instruments, differing proficiency levels, and differing musical techniques. In another further variation, searching further comprises: selecting additional songs by combination of instructor preferences for demonstration purposes, and student skills and techniques to be taught, that can then be played by the group of students using differing instruments, differing proficiency levels, and differing musical techniques.

In the following description reference is made to the accompanying drawings, which form a part hereof, and in which are shown example implementations. It should be understood that other implementations are possible, and that these example implementations are intended to be merely illustrative.

DESCRIPTION OF THE DRAWINGS

FIGS. 5A, 5B, and 5C taken together are a database schema diagram illustrating the various independent and dependent tables and relationships of the database of an embodiment of the invention.

DETAILED DESCRIPTION

Music education has critical societal benefits, and is of wide-spread interest. There is well-documented evidence that musical ability correlates to other skills and abilities. But, conventional music education is both linear and rigid, rendering it less sticky than desired. That is, students may not pick up new skills and performance levels, or retain old skills and performance levels as well as desired. Results are consequently poor at conventional music schools and programs; students drop music classes at an alarming frequency. In contrast, teaching and learning music is best done through immersion, through dialog with other students, and through dialog between students and teachers, all in both individual and ensemble settings. Immersion and dialog for the purposes of music education most often take place on a non-verbal level, through the common language and experience of the music, itself. One reason that conventional music schools do not simply change the balance between individual instruction and ensemble instruction is that simply switching to an ensemble model of learning poses substantial challenges. In addition to the complexities inherent in an ensemble of different instruments, it is rare that an ensemble can be assembled in which all members are at a common proficiency level, with common technical breadth and depth.

The present invention is practiced by a music studio having, or having access to, a database of music accessible using an app executing on a computer or device, or through a browser executing on a computer or device. The database includes plural layers of information relating songs and concepts, the selection of which is key. The layers may include such song-specific concepts as instrumentation requirements, techniques required, musical styles represented, and show theme suitability. Additional layers may include, but are not limited to, tempo, key, scales, time signatures, notable intervals, song form, and vocal range. Thus, an instructor can create a thematic performance for a group of musicians studying various instruments at different levels to build their skill sets and proficiency through experiential learning. Efficacy of the teaching and learning processes is improved by removing randomness from the educational journey. The journey is curated in a way to accommodate the variety of requirements of the group of students.

Figure 1:
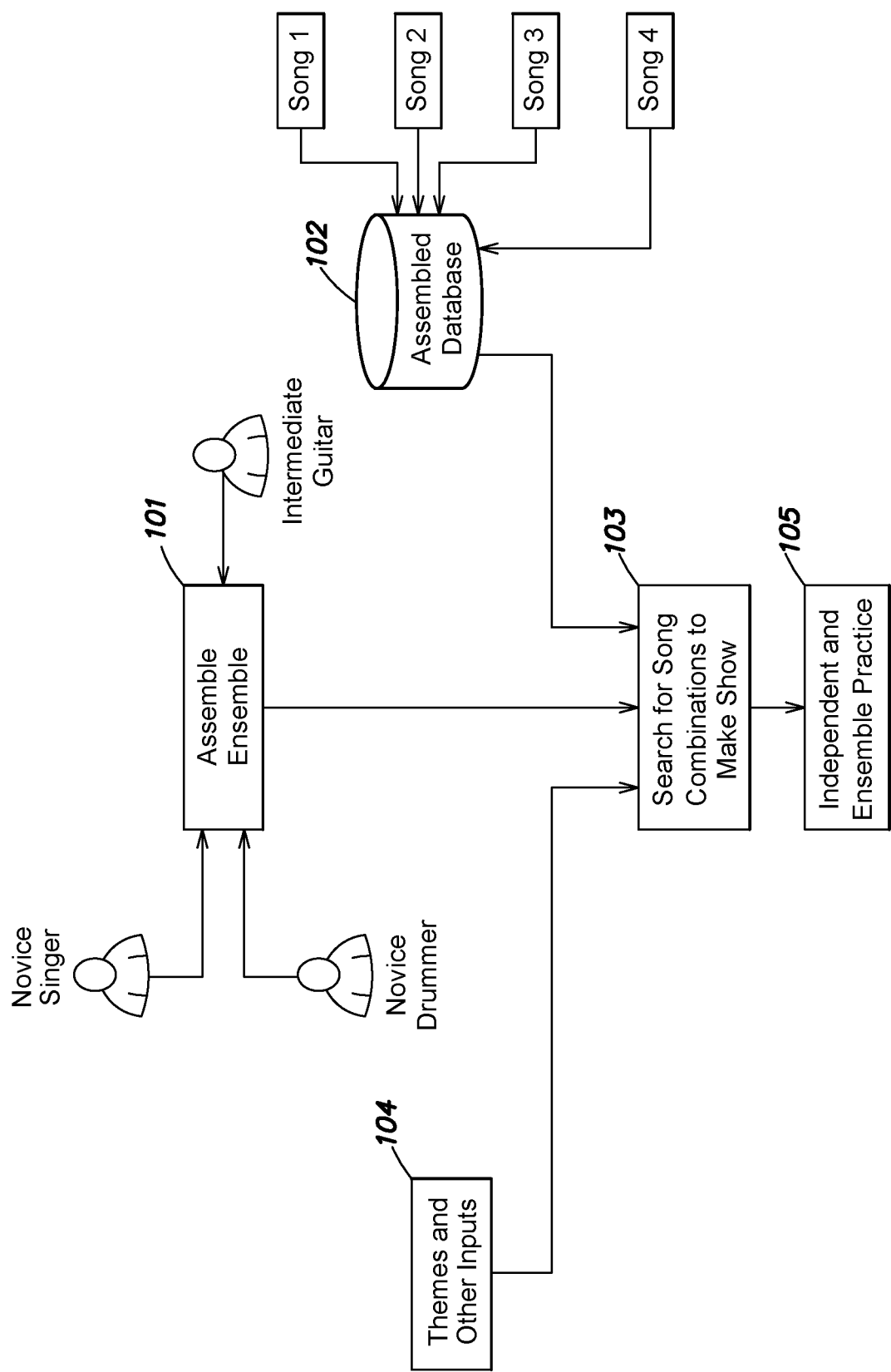
FIG. 1 is a process flow diagram showing an embodiment of the music education method of the invention.

As shown in FIG. 1, an embodiment of the method of the invention includes several activities, some of which must be performed with the assistance of computing systems, while others may be performed by a variety of means.

For example, an instructor, administrator, or other person may assemble an ensemble, 101, of students to learn, practice, and perform together. The choice of members in the ensemble may be somewhat arbitrary, depending on the desired result. A suitable mix of instruments (e.g., guitar, voice, drums, keyboards, etc.) may be a selection priority, while proficiency levels and skill sets may be subordinate considerations. The invention permits such mixing of levels by compensating when song selection for performance is addressed, later. A more important factor in assembling an ensemble, 101, is that the ensemble be structured around the desire to perform a show together, perhaps on the basis of a common musical interest, theme, etc.

A computer implemented database of songs is assembled. The database is organized so as to have multiple dimensions through which songs can be selected. This database is now briefly described, and will be described in further detail below.

The database, 102, may be stored in any conventional database server (FIG. 2, 203) supporting relational operations. For example, the database may be housed in a SQL server. The database server (FIG. 2, 203) may be housed at an individual music studio, at a centralized location serving plural music studios, or may be distributed. Copies of the database or portions thereof may be transferred to local storage or access devices, for offline access or faster operation, if desired.

We turn now to a brief description of the content and arrangement of the database, along with the query engine by which information is extracted. These features supply a unique ability to reduce friction in the pedagogical system, making it more effective and efficient.

Because performance-based music education captures the students' interests and engages them through immersion, the instructor begins the selection of songs, 103, by determining what type of show to assemble. One slice of the database is therefore the suitability of each song for a musical show of a given theme. Songs can be rated as suitable or unsuitable for each theme, or can be rated on a suitability continuum against each theme. The instructor decides on one or more themes for a performance, and any other specific searchable characteristics desired, and enters that information, 104. Another slice of the database is instrumentation requirements for each song. Instrumentation requirements may include which instruments are necessary to the performance of a song, as well as which instruments could be used if available, but may be omitted if unavailable. The instructor enters the instrumentation, 104, available in a group of students.

Of course, each student has arrived at a current point in time having within the range of their instrument, different skill sets (ie, techniques used with their instrument), different proficiency levels for each technique, and perhaps different stylistic interests. For each available student, the instructor enters into the query engine values for these slices of the database corresponding to each student's capabilities and desires.

Additional layers or slices of the database may, of course, be used. The foregoing exemplify several that have been found by the present inventors to reduce pedagogical efficiency dramatically, producing faster learning that is better retained by the students.

The query engine (FIG. 2, 206) extracts songs corresponding to themes for groups of students that match their learning level based on instrument, skill set, and proficiency level. The instructor or query engine group the students into ensembles either according to typical instrumentation for performance ensembles, either manually or automatically using heuristics, to better match ensembles with available songs. Each ensemble is thus matched with a suitable show theme, from which songs are selected to engage each student to achieve that student's next level, either by increasing proficiency in current skills or by adding a new skill to the student's repertoire.

The selection of songs by the query engine (FIG. 2, 206) may be programmed to return a group of songs for each ensemble that each increase the level of one or more students in the ensemble by one level in one or more areas (eg, known skills or proficiency levels), or may be programmed to return a group of songs for each ensemble where each song within the theme builds on the skills and proficiency levels of an earlier song, such that the group practices them in sequence so as to build a performance several levels higher than the students' capabilities at the outset of the current training period.

Students then engage in both independent and ensemble practice and performance, 105.

Figure 2:
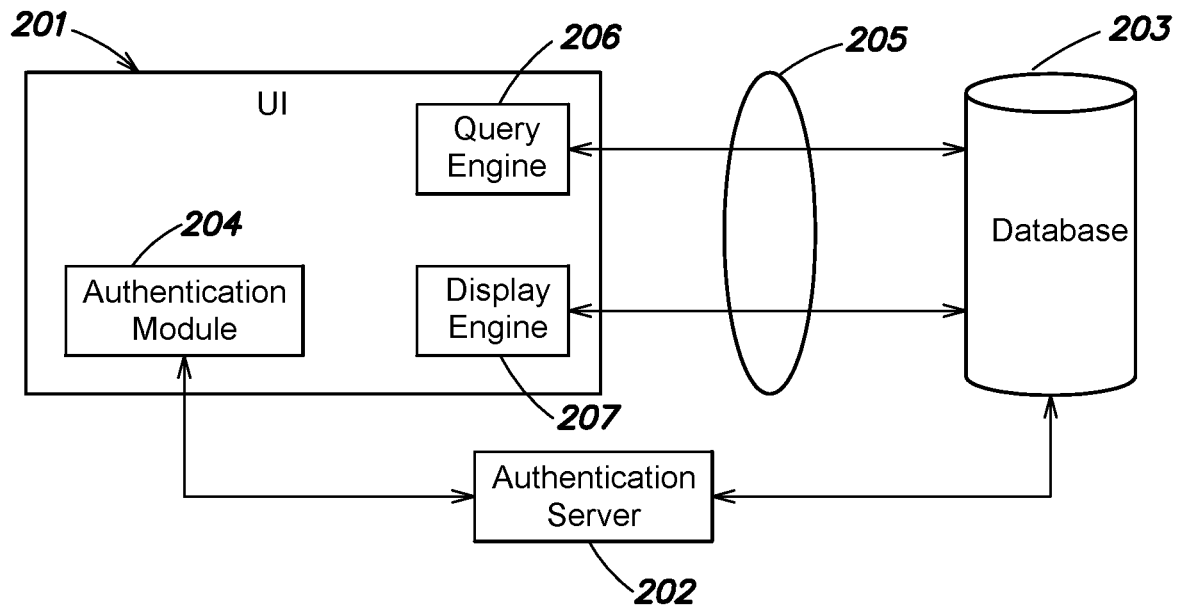
FIG. 2 is a block diagram of an embodiment of the computer-aided music education method of the invention.

FIG. 2 shows the general arrangement of a user interface, 201, authentication server, 202, and database server, 203, in which aspects of the invention may be embodied. In this embodiment, the instructor or student may enter credentials into an authentication module, 204, of the user interface, 201, in order to obtain specified access rights to the database, 203. The authentication server, 202, enables a channel, 205, to be established through which the user interface, 201, can communicate with the database, 203. Thus, the user (e.g. instructor or student) can query the database through query engine, 206, and receive results through display engine, 207. Conventional authentication and access protocols and methods can provide the instructors, students, and other users each with appropriate levels of access to their requirements as defined by the needs of each within the overall educational environment and process. For example, students may be limited to searching for certain types, levels, or other groupings of materials, while instructors may be able to access, annotate, or otherwise modify the database. Alternatively, modification may be prohibited to all, or different types of annotation open to all. Numerous other combinations of access and database enhancements that permit more efficient educational use of the database are contemplated as within the scope of this aspect.

Figure 3:
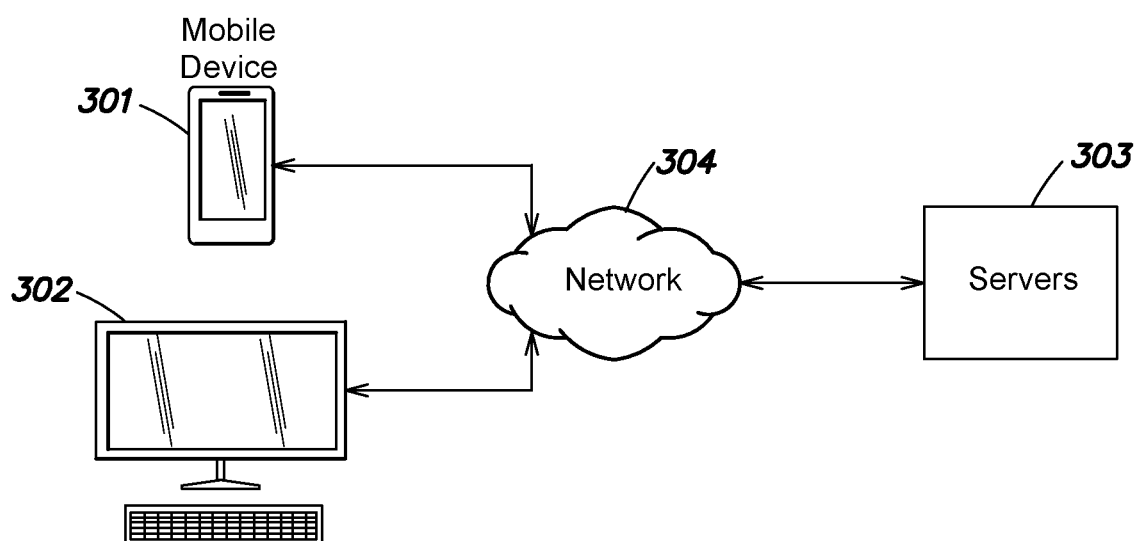
FIG. 3 is a block diagram of an embodiment of the music education system of the invention.

In general the system according to various embodiments, as shown in FIG. 3, include mobile devices, 301, and fixed computing assets, 302, that may include input or output devices, or may have other purposes such as local cacheing of at least portions of the database (FIG. 2, 203). The devices and other assets, 301 and 302, communicate with one or more servers, 303, through a network 304. Network, 304, may include local or wide-area components. The network 304, may include a combination of local connections allowing access to the global internet. Thus, servers, 303, may be physically located locally to the devices and other assets, 301 and 302, that communicate with the servers, 303, or may be physically remote therefrom.

Figure 4:
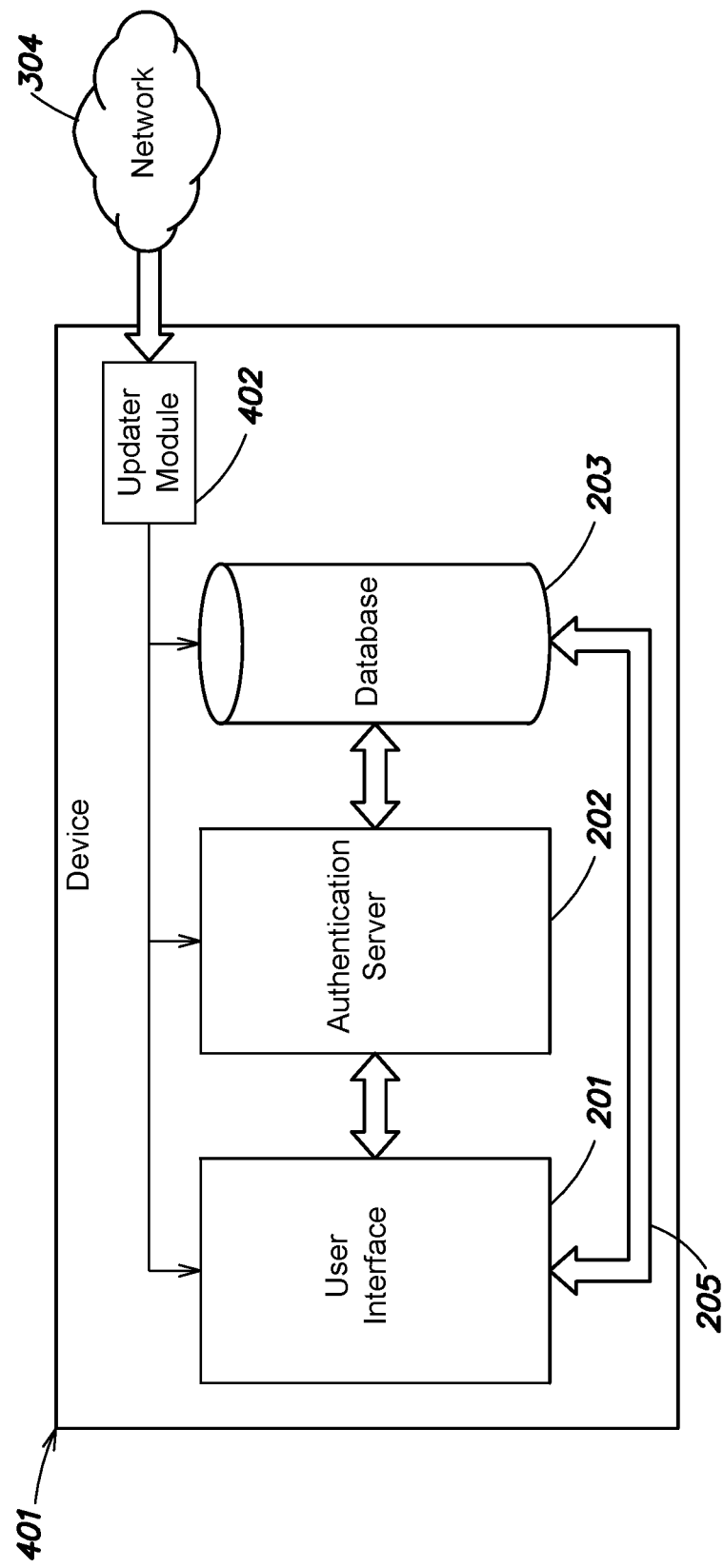
FIG. 4 is a block diagram of another embodiment of the music education system of the invention.

In an alternate embodiment, as shown in FIG. 4, a stand-alone system may be implemented in a single device, 401, or a local group of devices acting in concert as in a stand-alone mode. In such an implementation, the user interface, 201, the authentication server, 202, the database, 203, and the channel, 205, as well as the sub-components described above are all embodied in the local device, 401, or group of devices acting in concert. Such a stand-alone device may receive database updates through a local updater module, 402, connected when needed to a network, 304, over which the database updates are communicated.

Additional details of the database are now described in connection with FIGS. 5A, 5B, and 5C. This embodiment is implemented on a SQL server using the Django framework. Other database backends and frameworks can be used. Django officially supports SQLite, as well as PostgreSQL, MySQL, and Oracle.

Figure 5B:
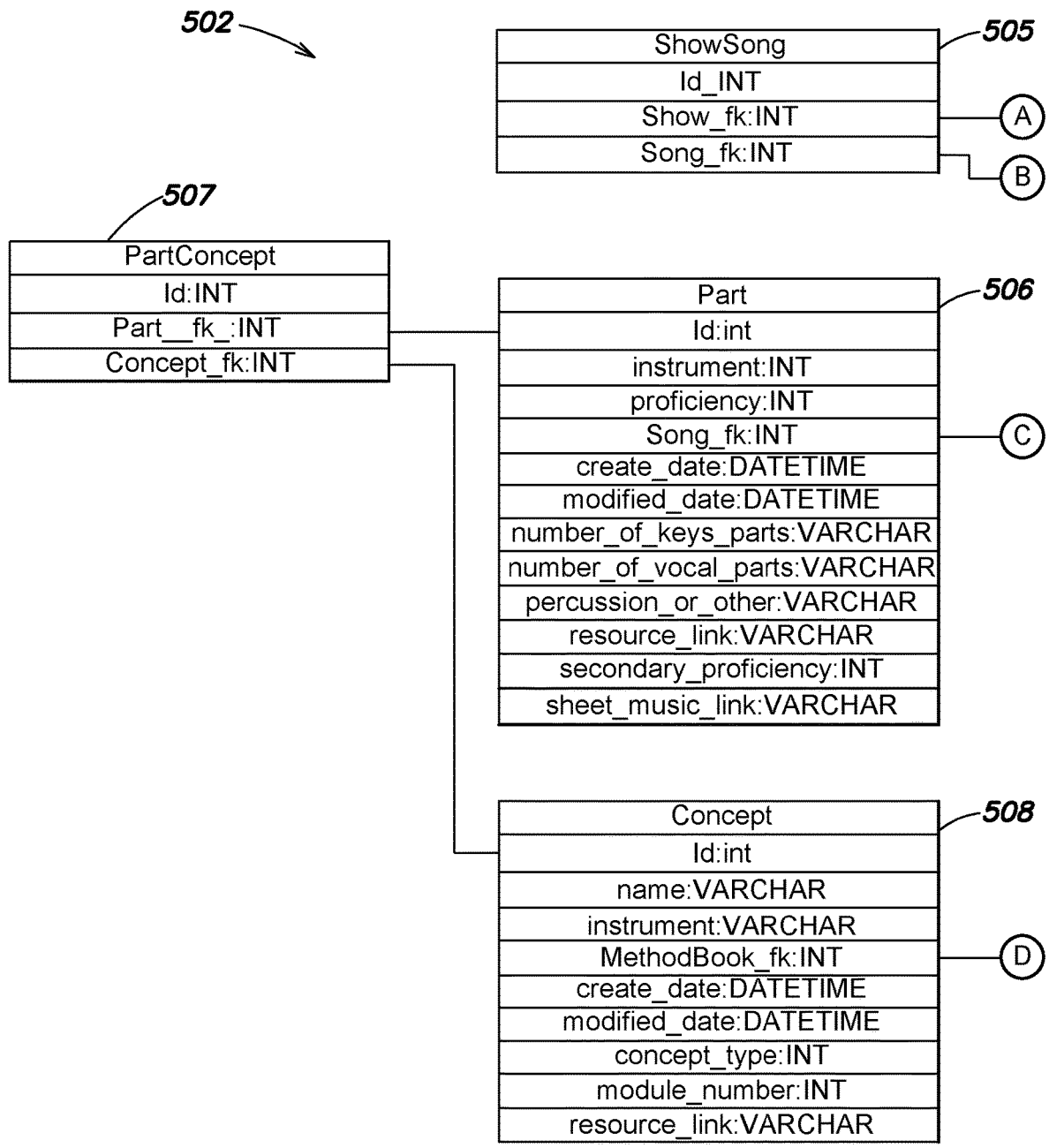
Figure 5C:
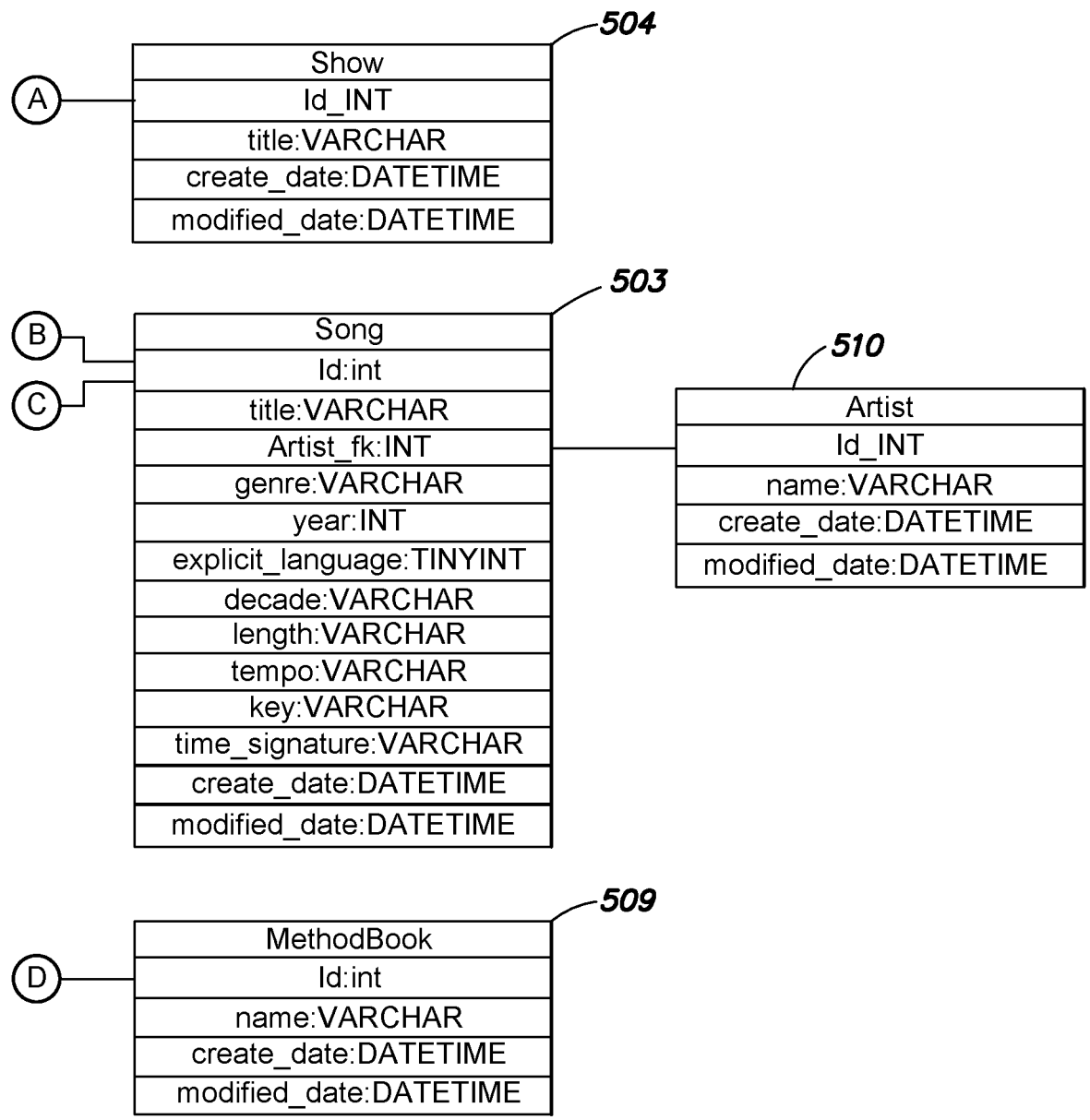

The database is preferably arranged in a multidimensional, relational structure, such as that shown in FIGS. 5A, 5B, and 5C. This structure better allows for expansion and/or contraction of the database as the catalog of songs available for performance, and therefore instrumentations, skills, and proficiency levels available to the instructor change, as well as permitting easier restructuring of the database to incorporate other levels or slices of the song catalog to accommodate new variables found to improve pedagogical efficacy.

In the exemplary database structure, the database includes a section of authentication-related content, 501, and a section of pedagogical content, 502. Songs, 503, are linked to shows, 504, through a show-song combining table, 505. Songs, 503, are also linked to the parts, 506, required or optional for each. The parts, 506, table also characterizes the song and part according to techniques, skills, and proficiency required to perform that song. By back-linking to a part-concept combiner, 507, songs, 503, can then be linked through concepts, 508, to specific method books, 509, in which the source material for student access and study is identified. Optionally, the source material may also be stored in the database, so students can use their devices to directly access assigned material published through the database to them.

Figure 6:
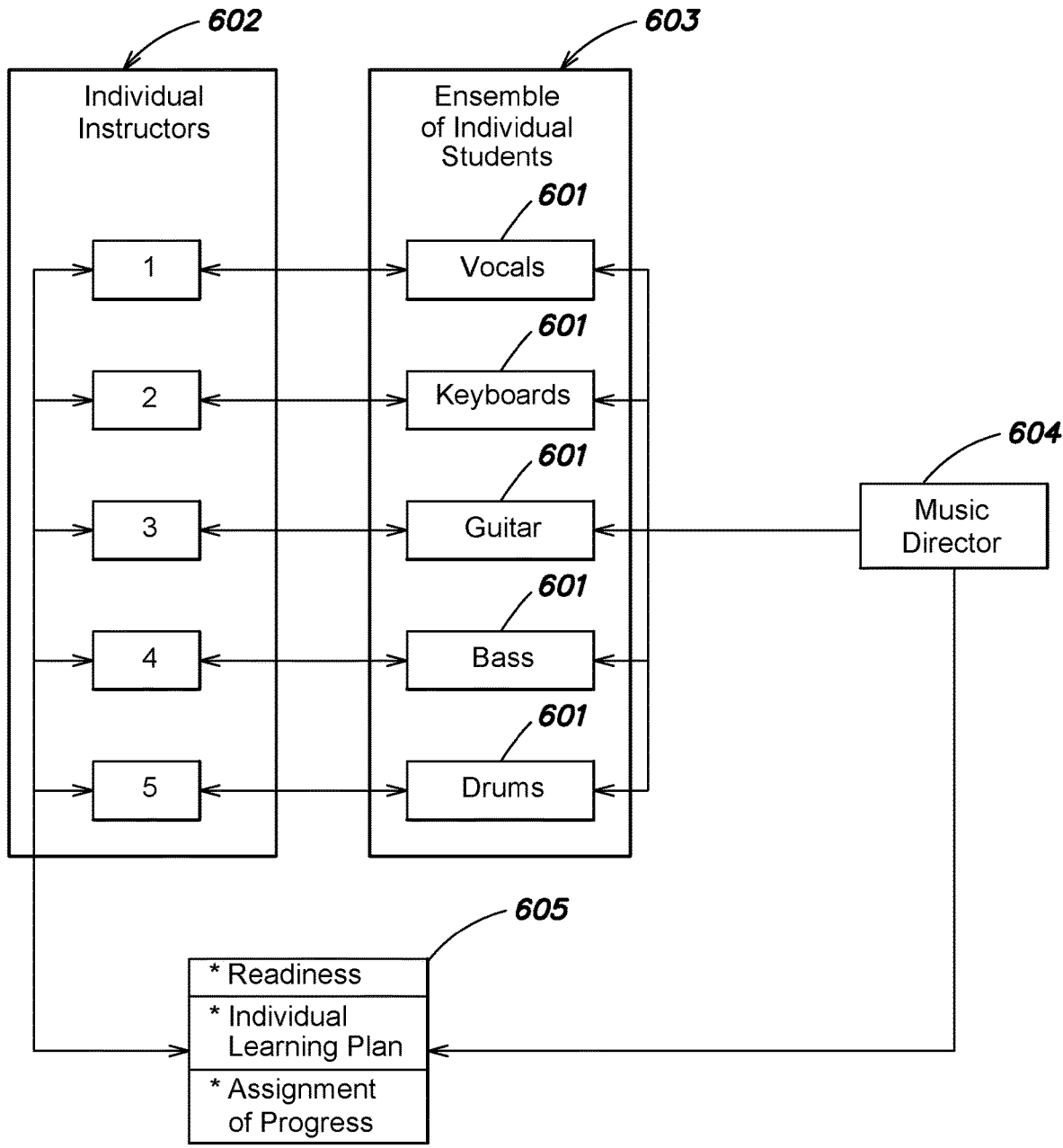
FIG. 6 is a block diagram showing an embodiment wherein the methods and structures of the invention facilitate collaboration between individual instructors and ensemble music directors/instructors.

In an embodiment in a music studio environment, as shown in FIG. 6, individual students studying at different proficiency levels, 601, taught in private lessons by individual instructors, 602, can coordinate as an ensemble, 603, under the direction of an ensemble music director, 604, also an instructor, using common tools, 605, including the database (FIG. 1, 102; FIG. 2, 203) described above. Both the individual instructors, 602, and the ensemble music director, 604, determine the students' readiness, individual learning plans, and assessments of progress using the common tools, 605, in a unified manner not achieved in conventional music schools.

For example, ensemble music director, 604, employs the common tools, 605, to select songs having parts requiring techniques and skill levels suitable to an ensemble of individual students, 601. Based on progress levels fed back into the database through the common tools, 605, the individual instructors, 602, receive feedback about the capabilities and shortcomings of individual students, 601. Knowing the individual capabilities and shortcomings of the individual students, 601, the individual instructors, 602, then adjust the training of the individual students, 601, in their individual instruments, techniques, and skills necessary to achieve success both individually and in their ensemble.

Feedback can also run the other direction, that is, from the individual instructors, 602, who make observations of the capabilities and shortcomings of the individual students, 601, which are then entered into the common tools, 605, from which the ensemble music director, 604, then makes additional selections or places different pedagogical emphasis on the songs performed by the ensemble, 603.

Numerous combinations and variations not specifically set forth herein will now be evident to the skilled artisan that are contemplated as within the scope of the invention claimed. Where considered reasonable and evident to the skilled artisan, elements of different variations described may be recombined to form additional embodiments where such come within the scope of the invention as claimed.

What is claimed is:

1. A computer-aided method of educating music students comprising:
    assembling an ensemble of at least three music students, the students using differing instruments at differing proficiency levels and focusing on differing musical techniques;
    compiling a multidimensional database of songs, wherein dimensions of the database include three or more of: instrumentation requirements, technique requirements, musical styles represented, proficiency levels, and show theme suitability;
    searching the database for songs having desired characteristics matching the differing instruments, differing proficiency levels, and differing musical techniques of the students;
    selecting a first song for the students based on results from the searching of the database, the selected first song being playable by the students using the differing instruments;
    receiving feedback regarding shortcomings of the students in regard to the students playing the first song; and
    selecting a second song based at least in part on the feedback, the second song having one or more of: (i) a different proficiency level for at least one of the differing instruments when compared to the first song, (ii) a different technique requirement for at least one of the differing instruments when compared to the first song, or (iii) a different musical style when compared to the first song.

2. The computer-aided method of claim 1, further comprising:

selecting songs by skills and techniques to be taught in individual lessons to individual students of the ensemble of students, wherein the selected songs are playable by the ensemble of students using the differing instruments, differing proficiency levels, and differing musical techniques, and wherein the first song and the second song are included in the selected songs.

3. The computer-aided method of claim 2, wherein the selected songs fit a common show theme.

4. The computer-aided method of claim 2, further comprising:

selecting additional songs by a combination of student preferences, skills, and techniques to be taught, the additional songs being playable by the ensemble of students using their differing instruments, differing proficiency levels, and differing musical techniques.

5. The computer-aided method of claim 2, further comprising:

selecting additional songs by a combination of instructor preferences for demonstration purposes, and student skills and techniques to be taught, the additional songs being playable by the ensemble of students using their differing instruments, differing proficiency levels, and differing musical techniques.

6. The method of claim 1, wherein the feedback is based on individual performance of the students.

7. The method of claim 1, wherein the feedback is based on collective performance of the students.

8. An improved music education system comprising:

a server holding a multidimensional database of songs, wherein dimensions of the database include three or more of: instrumentation requirements, technique requirements, musical styles represented, proficiency levels, and show theme suitability; and a client, in cooperation with the server, is configured to:
provide search parameters for searching the database for songs having desired characteristics matching differing instruments, differing proficiency levels, and differing musical techniques of a group of students;
receive search results from the server, the search results including a first song, the first song being playable by the students using the differing instruments;
select a second song based at least in part on feedback regarding shortcomings of the students in regard to the students playing the first song, the second song having one or more of: (i) a different proficiency level for at least one of the differing instruments when compared to the first song, (ii) a different technique requirement for at least one of the differing instruments when compared to the first song, or (iii) a different musical style when compared to the first song.

9. The music education system of claim 8, wherein the client is further configured to:

select songs by skills and techniques to be taught in individual lessons to individual students of the group of students, wherein the selected songs are playable by the group of students using the differing instruments, differing proficiency levels, and differing musical techniques, and wherein the first song and the second song are included in the selected songs.

10. The music education system of claim 9, wherein the selected songs fit a common show theme.

11. The music education system of claim 9, wherein the client is further configured to:

select additional songs by a combination of student preferences, skills, and techniques to be taught, the additional songs being playable by the group of students using differing instruments, differing proficiency levels, and differing musical techniques.

12. The music education system of claim 9, wherein the client is further configured to:

select additional songs by combination of instructor preferences for demonstration purposes, and student skills and techniques to be taught, the additional songs being playable by the group of students using the differing instruments, differing proficiency levels, and differing musical techniques.

13. The music education system of claim 8, wherein the feedback is based on individual performance of the students.

14. The music education system of claim 8, wherein wherein the feedback is based on collective performance of the students.

* * * * *